(12) United States Patent
Shmunk et al.

(10) Patent No.: US 10,321,025 B2
(45) Date of Patent: Jun. 11, 2019

(54) MOBILE DEVICE WITH FOLDING OPTICAL ELEMENTS

(71) Applicant: Almalence Inc., Austin, TX (US)

(72) Inventors: Dmitry Valerievich Shmunk, Novosibirsk (RU); Eugene Alexandrovich Panich, Novosibirsk (RU)

(73) Assignee: ALMALENCE INC., Austin, TX (US)

( * ) Notice: Subject to any disclaimer, the term of this patent is extended or adjusted under 35 U.S.C. 154(b) by 0 days.

(21) Appl. No.: 15/515,105

(22) PCT Filed: Aug. 18, 2015

(86) PCT No.: PCT/RU2015/000517
§ 371 (c)(1),
(2) Date: Mar. 28, 2017

(87) PCT Pub. No.: WO2016/053140
PCT Pub. Date: Apr. 7, 2016

(65) Prior Publication Data
US 2017/0244871 A1     Aug. 24, 2017

(30) Foreign Application Priority Data
Oct. 2, 2014 (RU) .................... 2014140001

(51) Int. Cl.
*G03B 5/02* (2006.01)
*H04M 1/02* (2006.01)
(Continued)

(52) U.S. Cl.
CPC ......... *H04N 5/2251* (2013.01); *G02B 13/001* (2013.01); *G03B 5/02* (2013.01); *G03B 17/04* (2013.01); *H04M 1/0264* (2013.01)

(58) Field of Classification Search
CPC ................ H04N 5/2251; G02B 13/001
(Continued)

(56) References Cited

U.S. PATENT DOCUMENTS 3,683,770 A * 8/1972 Land ............... G03B 17/04
396/33
3,836,933 A * 9/1974 Hochreiter ............. G03B 17/04
396/348
(Continued)

FOREIGN PATENT DOCUMENTS

| CN | 102984308 A | 3/2013 | |
| CN | 203368530 U | 12/2013 | |
| JP | 2006-325195 | * 11/2006 | ............. H04M 1/21 |

*Primary Examiner* — Lin Ye
*Assistant Examiner* — Chan T Nguyen
(74) *Attorney, Agent, or Firm* — Cantor Colburn LLP

(57) ABSTRACT

A device having a camera module, installed on the housing of the device such that the position of the camera module relative to the housing can be changed. One of the positions, an exposure position, involves optical elements which are oriented so as to be able to project light onto light-sensitive elements in order to produce an image on one or more sensors. A second position involves being flush against, and as close as possible to, the housing of the mobile device, by means of folding. The overall thickness of the camera module is structurally limited by the thickness of the thickest optical or light-sensitive element. The device contains structural elements for processing a digital representation of an image obtained from the light-sensitive elements. The camera module includes optical elements in the form of a set of thin lenses and/or mirrors, and one or a plurality of light-sensitive elements, namely sensors consisting of light-sensitive pixels. If the camera module has a plurality of sensors and a plurality of groups of lenses, separate light flows are directed onto corresponding sensors, wherein means for processing the digital representation of the image unite the
(Continued)

images obtained from the sensors so as to produce a single image of increased quality. The use of a mobile device having such a camera module allows for producing high-quality images, especially in low-light conditions, while maintaining small device dimensions.

3 Claims, 6 Drawing Sheets

(51) Int. Cl.
  *G02B 13/00* (2006.01)
  *G03B 17/04* (2006.01)
  *H04N 5/225* (2006.01)
(58) Field of Classification Search
  USPC .......................................................... 348/335
  See application file for complete search history.

(56) References Cited

U.S. PATENT DOCUMENTS

| | | | |
|---|---|---|---|
| 7,898,749 B2 | | 3/2011 | Ford et al. |
| 7,944,498 B2 * | | 5/2011 | Sung ........................ G02B 7/38 |
| | | | 348/252 |
| 9,025,038 B2 * | | 5/2015 | Tsutsumi ............. H04N 5/2258 |
| | | | 348/208.11 |
| 2004/0032525 A1 * | | 2/2004 | Aharon ................ H04N 3/1587 |
| | | | 348/350 |
| 2004/0240052 A1 * | | 12/2004 | Minefuji ............ G02B 13/0015 |
| | | | 359/435 |
| 2011/0080487 A1 | | 4/2011 | Venkataraman et al. |
| 2014/0364168 A1 * | | 12/2014 | Galuszka ............ H04M 1/0264 |
| | | | 455/556.1 |

* cited by examiner

MOBILE DEVICE WITH FOLDING OPTICAL ELEMENTS

This nonprovisional application is a continuation of International Application No. PCT/RU2015/000517, which was filed on Aug. 18, 2015, and which claims priority to Russian Patent Application No. 2014140001, which was filed in Russia on Oct. 2, 2014, and which are both herein incorporated by reference.

BACKGROUND OF THE INVENTION

Field of the Invention

This invention relates to the field of photo- and videography.

Description of the Background Art

Conventional mobile devices have a wide range of functions. One of the most popular functions is the recording of photographic and video material. In order to take photographs and record videos with mobile devices, units called camera modules are used. A camera module incorporates a photosensitive sensor, optical-system lenses, and, in some cases, components for a focusing system.

In recent years the technical characteristics of camera modules in contemporary mobile devices have improved appreciably. Theoretical limits have virtually been reached for optical quality (optical resolution is constrained by the diffraction limit) and for sensor performance (the conversion of photons into an electric charge is reaching a level close to 100%). There is a further limit, namely, the minimum dimension of an individual photosensitive element in the sensor (pixel). In contemporary sensors the size of the pixel has reduced to 1 µm, which is comparable to the wavelength of the light being detected. A further reduction in the size of the pixel will not lead to an increase in the image resolution because of the proximity to the diffraction limit. Limits on the use of space have also been reached. The length and width of the camera module are limited by the dimensions of the photosensitive sensor, and its height is limited by the lens system (camera lens). To produce a high-quality and clear image, complicated camera lenses are needed that comprise a large number of separate elements.

Further, improvement in the quality of the recorded image is not possible without increasing the transmission of light to the photosensitive element (sensor). The maximum amount of light reaching the sensor is limited by the diameter of the inlet aperture of the optical system. An increase in the inlet aperture requires an overall increase in the geometric dimensions of the camera module. The geometric dimensions are, in turn, limited by the mobility requirement. The greatest limitation relates to the height (the height of the camera module must not appreciably exceed the overall thickness of the base device). But the height of the camera module depends on the overall thickness of the lenses in the lens system and the necessary gaps between the lenses.

The following is a list of fundamental problems that result from decreasing the amount of light entering camera modules on mobile devices:

High levels of noise in the resulting image decrease the overall visual quality.

In low lighting, it becomes necessary to use long exposure time, which causes blur. Since cameras are typically handheld, photographs blur not just as a result of object motion but also because the camera itself is moving.

Moreover, small camera modules necessitate proportionately small pixels on the sensor. As a result, the pixel can hold only so much charge before draining, which means that the camera cannot flawlessly capture an image with a high dynamic range that most scenes present.

The following technical solutions are available to improve the quality of images produced with camera modules on mobile devices:

1. Array camera. By using several camera modules grouped together on one device, it is possible to increase the amount of light intake by combining the charges from all sensors, for example, from US Pub No. 2011/0080487 which corresponds to U.S. Pat. No. 8,866,920 B2, Capturing and processing of images using monolithic camera array with heterogeneous imagers, Kartik Venkataraman, Amandeep S. Jabbi, Robert H. Mullis, Jacques Duparre, Shane Ching-Feng Hu).

One drawback of this technique is that the overall cost of camera modules will increase proportionately to the number of modules. The amount of space taken up by camera modules will also increase.

2. Effective noise-reduction algorithms. Significant progress has been achieved recently in separating image from noise in noisy images described in U.S. Pat. No. 7,835,586, Method for filtering images with bilateral filters, Fatih M. Porikli.

This method is severely restricted by the limit of the signal-to-noise ratio. Low-contrast details are impossible to separate from noise. That is, they are lost during noise reduction.

3. Multiframe exposure. By taking several photographs in rapid succession and combining them, image noise can be reduced, the dynamic range can be extended, and resolution can potentially be increased as disclosed in U.S. Pat. No. 8,699,814, Method for improving images, Dmitry Valerievich Shmunk, Eugene Alexandrovich Panich; US 2013/0156345, Method for producing super-resolution images and nonlinear digital filter for implementing same, Dmitry Valerievich Shmunk.

Combining several frames, however, increases total exposure time, causing problems that cannot be entirely avoided, such as moving objects appearing blurred.

The method for reducing the overall size of a camera by using a folding design has been known, for example, from U.S. Pat. No. 1,435,646, Folding camera, Robert Kroedel.

One disadvantage of this design is that its simplicity entails the use of small-aperture optics (apertures used are f/8-f/11). Any attempt to use a folding structure with the system of a modern high-aperture (f/4-f/2) and high-resolution camera lens leads to an extremely complex design whose drawbacks manifest in its brittleness and the need to allocate additional space for this system. Modern camera lenses consisting of a plurality of component lenses are exceptionally demanding in terms of the precise placement of the lenses and the photosensitive element relative to one another (alignment, distance, etc.). Adding a complicated folding structure inevitably leads to a substantial decrease in the precision of their placement. In addition, the use of a folding structure in a mobile device is impossible because in most cases, the optical system is surrounded by a focusing system, which is typically a monolithic structure and does not allow the optical system to be folded.

A camera module is known, for example, from Eric J. Tremblay, Ronald A. Stack, Rick L. Morrison, Joseph E. Ford, "Ultrathin Cameras Using Annular Folded Optics," *Applied Optics*, vol. 46, no. 4, 1 Feb. 2007, in which a pair of specially shaped mirrors replace the set of lenses in the traditional optical system. The mirrors are placed opposite each other. Because of the multiple reflections between the mirrors in the system, the optical path is substantially greater than the distance between the mirrors. This method can significantly reduce the thickness of the camera module while increasing the amount of light reaching the photosensitive element. An additional advantage of this solution is that it is free from chromatic aberration because it uses only reflective elements.

A disadvantage of this solution is its low depth of field. This is because light comes into the optical system through a narrow rim around the perimeter of the mirrors. Another disadvantage is the low angular field of view captured by this solution. It is not possible to create the most demanded type, a wide-angle camera module.

The closest technical solution to the proposed (prototype) is described in Felix Heide, Mushfiqur Rouf, Matthias B. Hullin, Bjorn Labitzke, Wolfgang Heidrich, Andreas Kolb, "High-Quality Computational Imaging Through Simple Lenses," ACM Transactions on Graphics, vol. 32, no. 5, 2013, 10 pages, ISSN:0730-0301, EISSN: 1557-7368, DOI: 10.1145/2516971.2516974, which uses a simplified optical system consisting of a single lens allowing the weight of the camera module to be reduced considerably. Aberrations that inevitably arise as a consequence of using a single optical element are offset by subsequent digital processing of the resulting image.

A drawback of this solution is that it cannot be used on mobile systems since replacing several optical elements with a single element does not reduce the size of the camera lens. Consequently, the overall size of the camera module does not change. It is possible to enhance the compactness of this optical system by adding known folding designs used in photography; however, this does not produce the required result since to achieve the required lens speed in this solution, the lens would need to be sufficiently thick.

Accordingly, the aim of the proposed solution is to create a mobile device that would use a camera module allowing high-quality images to be produced, particularly in low-light conditions, while retaining the small dimensions of the device.

SUMMARY OF THE INVENTION

It is therefore an object of this disclosure to provide a mobile device with a camera module that incorporates the optical elements, one or several photosensitive elements (sensors consisting of photosensitive pixels), and means to process the digital representation of the image obtained from the photosensitive elements, the optical elements are made as a set of thin lenses, mirrors, or both, and the camera module is installed such that position of its elements relative to the mobile device's case can be adjusted into two positions, one of which is an exposure position wherein optical elements are oriented to allow light to be projected onto photosensitive elements so that an image can be obtained on one or several sensors, and the second of which is as close as possible to the case by being folded and in which the total thickness of the camera module is structurally limited by the thickness of the thickest of the optical or photosensitive elements. In the proposed solution the complex optical system has been replaced with a simplified set of thin optical elements, and distortions (aberrations) in an image (which are an unavoidable consequence of simplifying the optical system) are corrected within the digital image-processing unit. The use of a small number of thin lenses gives rise to the possibility of making the system foldable. The accuracy requirements for the alignment of the lenses and the sensor are significantly reduced by using digital image-processing technology, which is capable of compensating for inaccuracies.

For correcting distortions, it is possible to use digital image-processing algorithms described, for example, in Felix Heide, Mushfiqur Rouf, Matthias B. Hullin, Bjorn Labitzke, Wolfgang Heidrich, Andreas Kolb, "High-Quality Computational Imaging Through Simple Lenses," ACM Transactions on Graphics, vol. 32, no. 5, 2013, 10 pages, ISSN: 0730-0301, EISSN: 1557-7368, DOI: 10.1145/2516971.2516974. The camera module is thin when folded, which enables the use of both lenses and photosensitive elements of greater diameter, thereby significantly increasing light intake (in proportion to the square of the lens diameter).

BRIEF DESCRIPTION OF THE DRAWINGS

The present invention will become more fully understood from the detailed description given herein below and the accompanying drawings which are given by way of illustration only, and thus, are not limiting of the present invention, and wherein.

DETAILED DESCRIPTION

Figure 1:
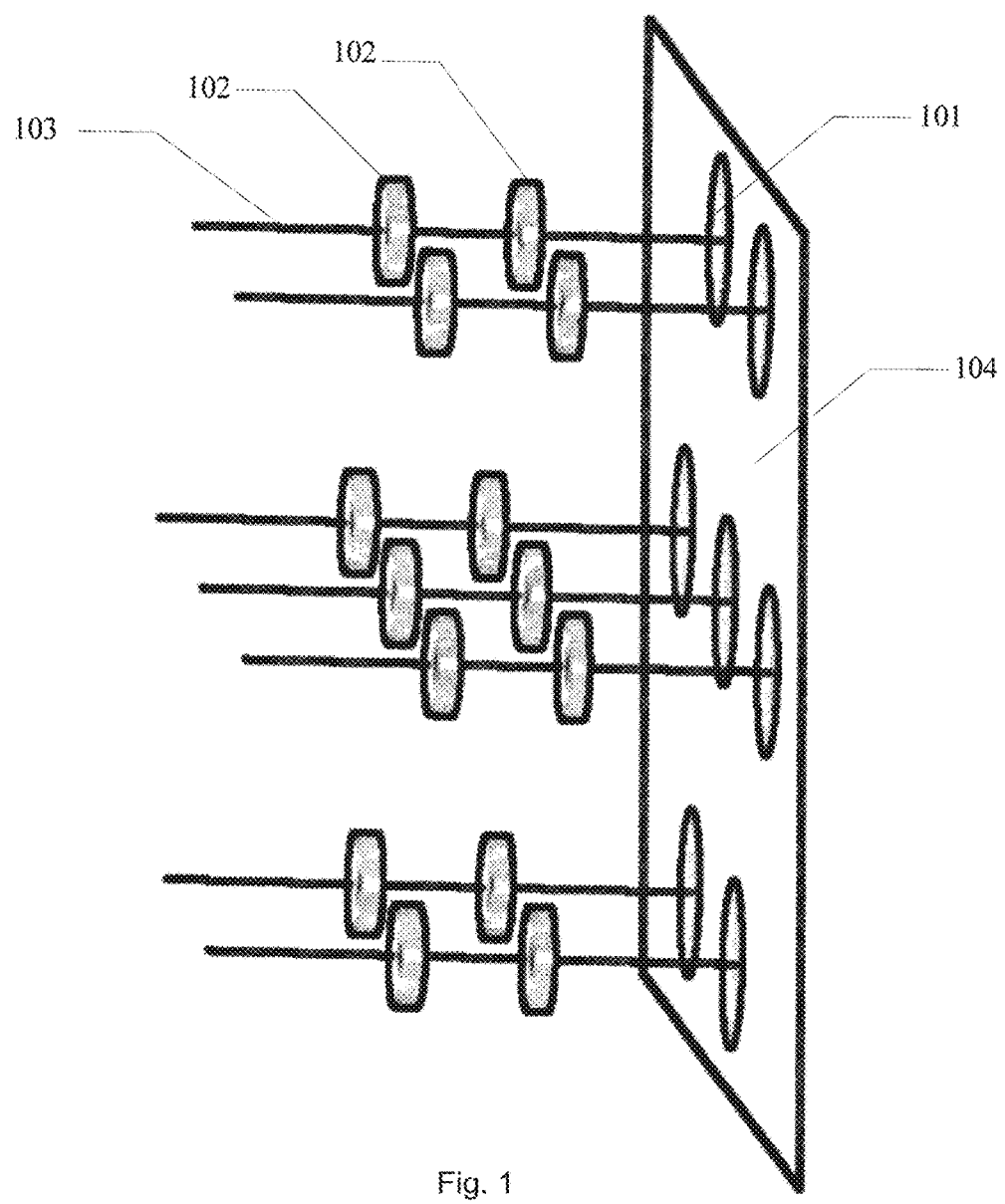
FIG. 1 shows a mobile device: (101) sensors; (102) optical elements; (103) auxiliary lines indicating the optical axes; and (104) sensor plane.

FIG. 1 shows a mobile device comprising of (101) sensors; (102) optical elements; (103) auxiliary lines indicating the optical axes; and (104) sensor plane. Seven optical systems, each consisting of two groups of lenses, are used to project images onto seven sensors. The characteristics of lenses in each system differ so as to capture the full range of distances in focus.

Photographic and video recording with the proposed device takes place in the following manner: the camera module extends into the exposure position relative to the mobile device's case. In this position optical elements are oriented to project light onto photosensitive elements. The exposure of the photosensitive elements takes place over as much time as required. Information taken from the photosensitive elements is converted into digital form and processed by the digital image-processing unit. The digital image-processing unit corrects distortions, monochromatic aberrations (spherical aberrations, comas, astigmatism, and field curvature), chromatic (lateral and tangential) aberrations, and also higher-order aberrations caused by the camera module's optical system during exposure. The digital image-processing unit also improves image quality (sharpness, contrast, color saturation, etc.). If several frames are captured or a video is recorded, the process repeats for each frame.

To facilitate transportation of the mobile device, the camera module is folded, which draws the optical elements and sensors as close as possible to the mobile device's case. This way, mobile-device dimensions are not significantly increased.

Figure 2:
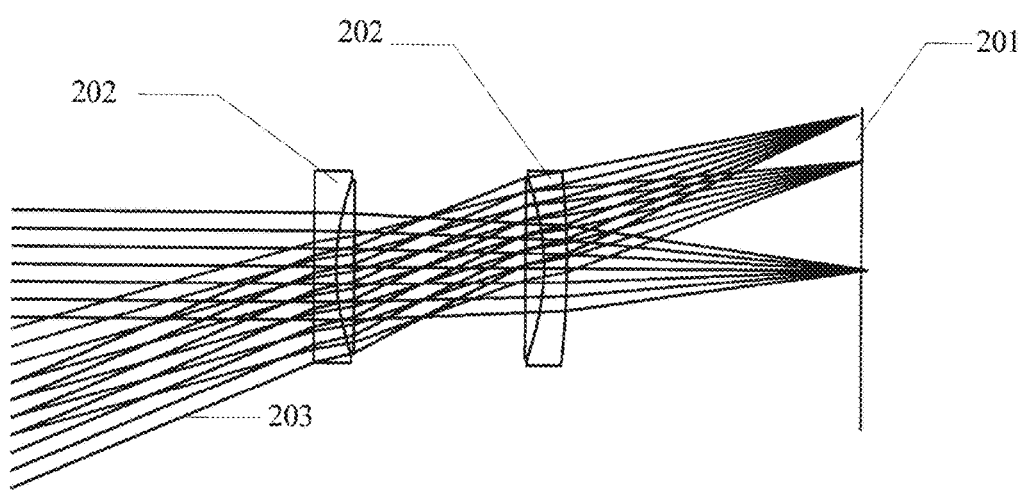
FIG. 2 shows light beams passing through one of the seven optical systems: (201) sensor; (202) optical elements; and (203) auxiliary lines indicating light beams passing through the system.
Figure 3:
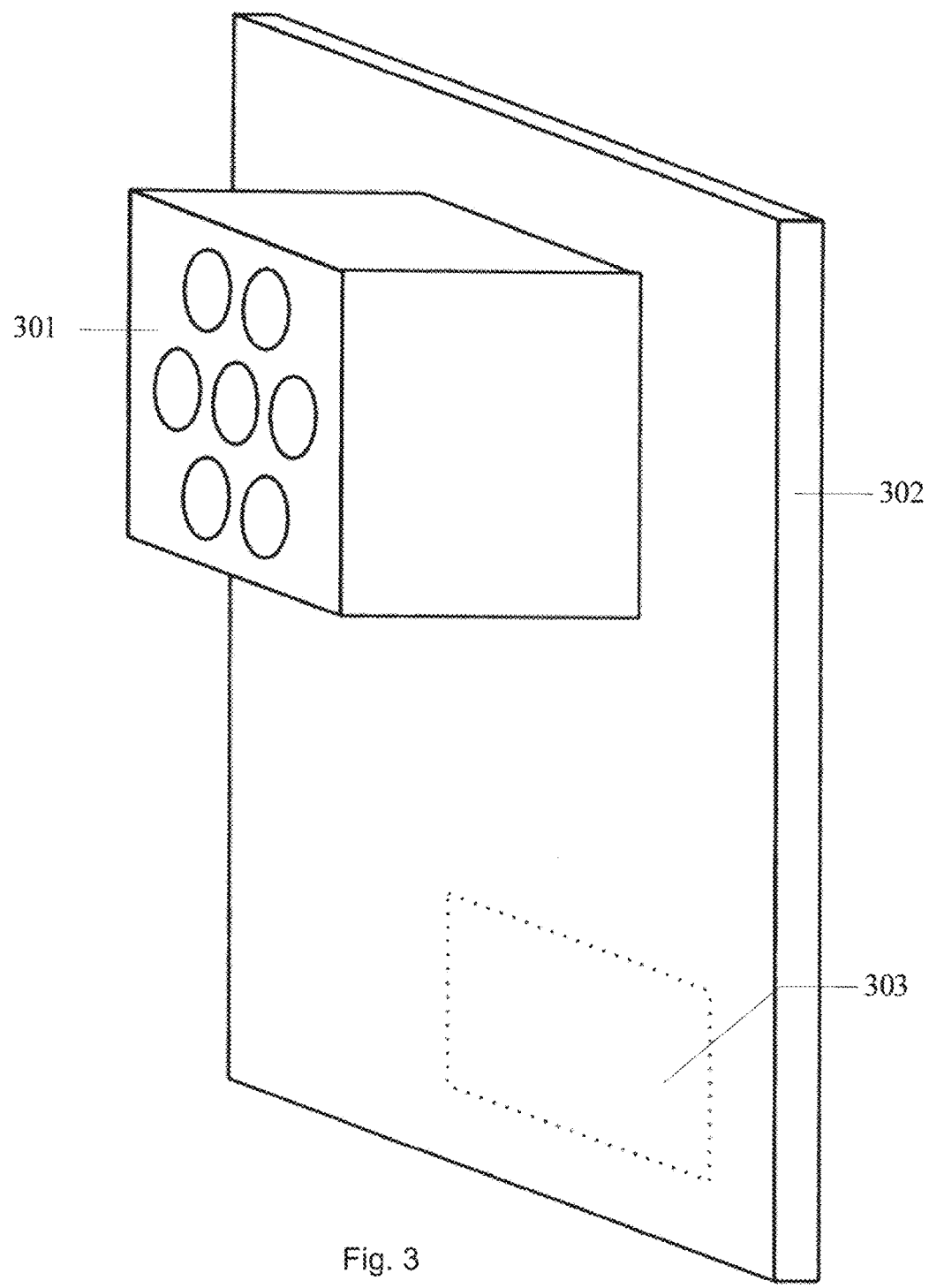
FIG. 3 shows an example of how a camera module in the exposure position is placed on a mobile device: (301) camera module in the exposure position; (302) case of the mobile device; and (303) example of how the digital image-processing unit is placed.

To eliminate the need for additional focusing means, several groups of optical elements paired with the necessary number of sensors are used. Each group of optical elements and its sensor are configured for a slightly different focusing distance. Each group of optical elements consists of a small quantity of thin lenses that are placed at a sufficient distance apart so that a simple folding mechanism can be used. For example, FIG. 2 shows two groups of lenses being used. Thus, separate sensors obtain images that are focused at different distances. Digital-processing facilities are used to select the necessary focusing distance from those available, or a focused image is obtained at an intermediate distance by using images from several sensors. Consequently, it is not necessary to use additional mechanisms for changing the lens position if focusing at various distances is required. The optical system is significantly simplified, the need to correct field curvature is eliminated, and, usually, so is the need to correct chromatic distortions. With digital processing facilities, it is possible to select the most focused areas for each of the sensors and combine them in order to obtain a sharp and high-quality image.

In another embodiment of the camera module, the optical system uses two elements, a primary, simple lens and a set of microlenses placed near the photosensitive element that correct distortions caused by the primary lens. Microlenses are designed to correct precisely those distortions that occur in the part of the image covered by a given microlens. Image quality deteriorates on pixels are located near the edges of the microlenses (this is caused by the intersection with the image from the neighboring microlens and by other factors). Therefore, it is necessary to use several of these groups with altered microlens placement and subsequently combine image parts from various sensors by using digital methods.

It should be understood that other embodiments of the camera module are possible that use the general principle: a simplified optical system consisting of thin lenses of a sufficiently large diameter (made possible thanks to the system being located outside the mobile device's case) provides high lighting levels, and this, combined with the digital processing of images derived from photosensitive elements, enables a small-sized device to produce a high-quality image.

Figure 5:
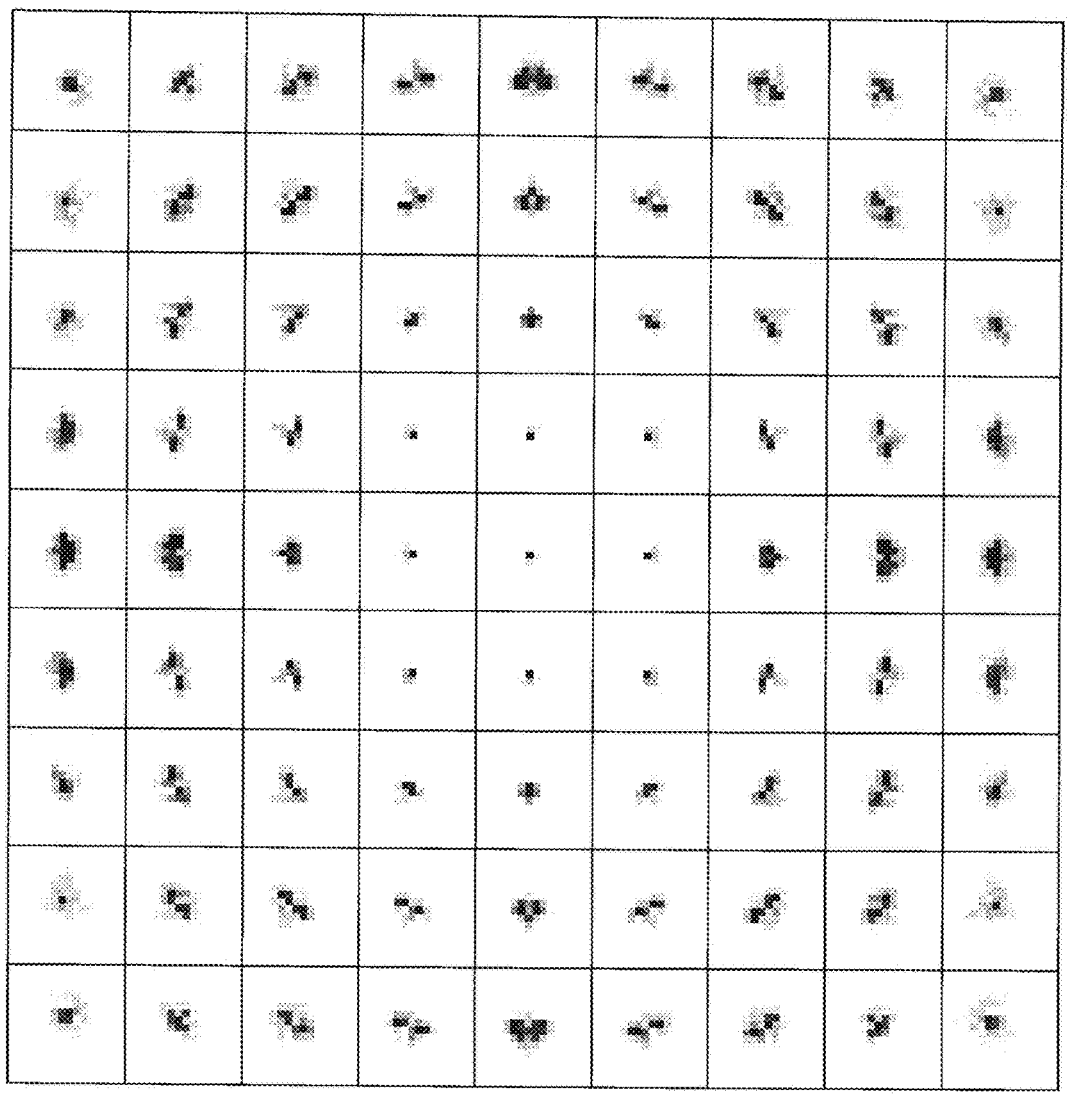
FIG. 5 displays point spread functions (PSFs) on various parts of the image before digital image processing is applied.
Figure 6:
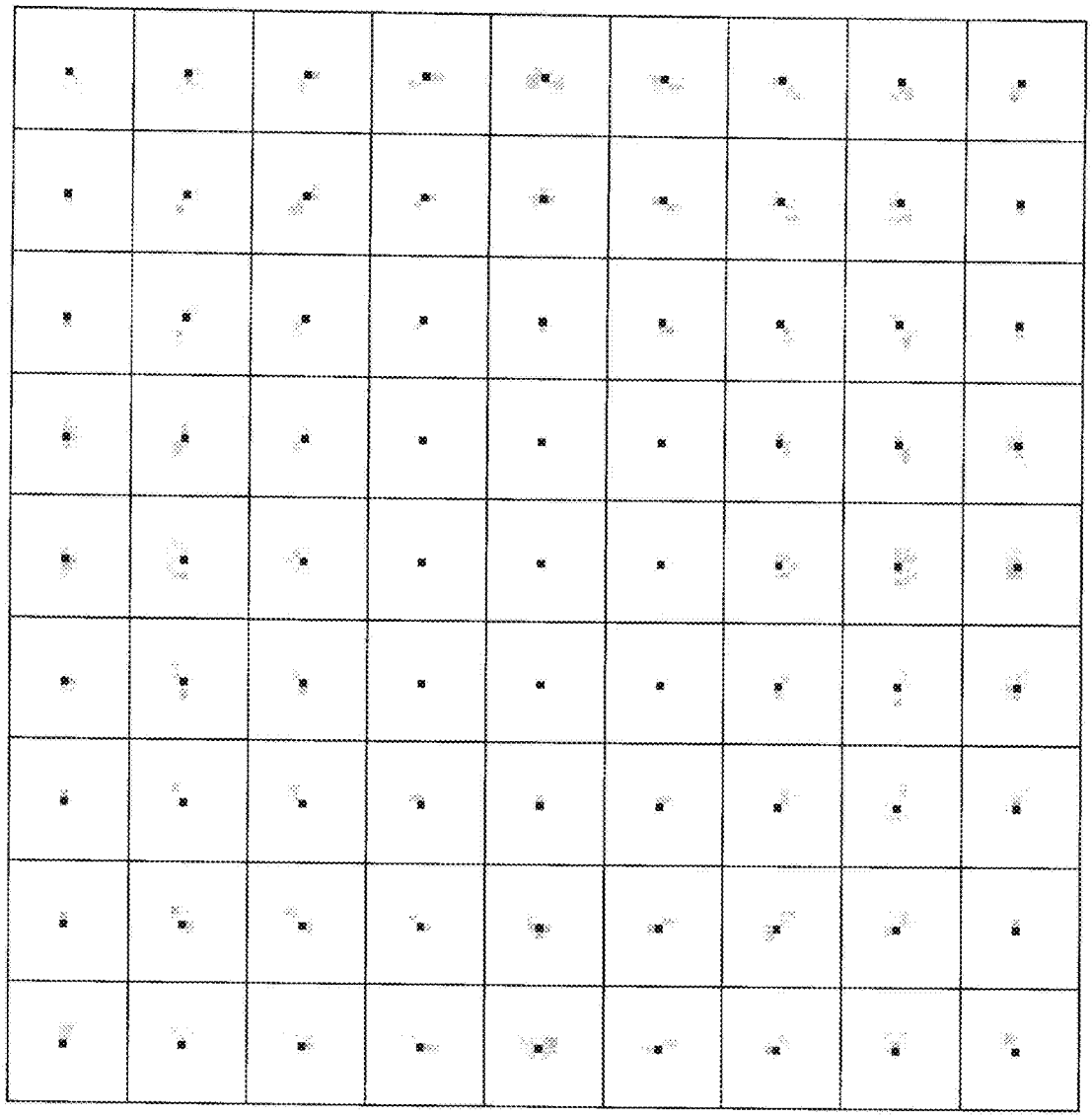
FIG. 6 displays PSFs on various parts of the image after digital image processing is applied.

In yet another embodiment of the present invention, a camera module using a Cooke triplet with thin lenses, an f/3.1 aperture, a 40 degree field of vision, 13.2×8.8 mm sensor, and 2.5 μm pixels was provided. Point spread functions were obtained across the entire image field for various wavelengths. FIG. 5 maps the point spread functions before digital processing, while FIG. 6 maps the point spread functions after digital processing.

Figure 4:
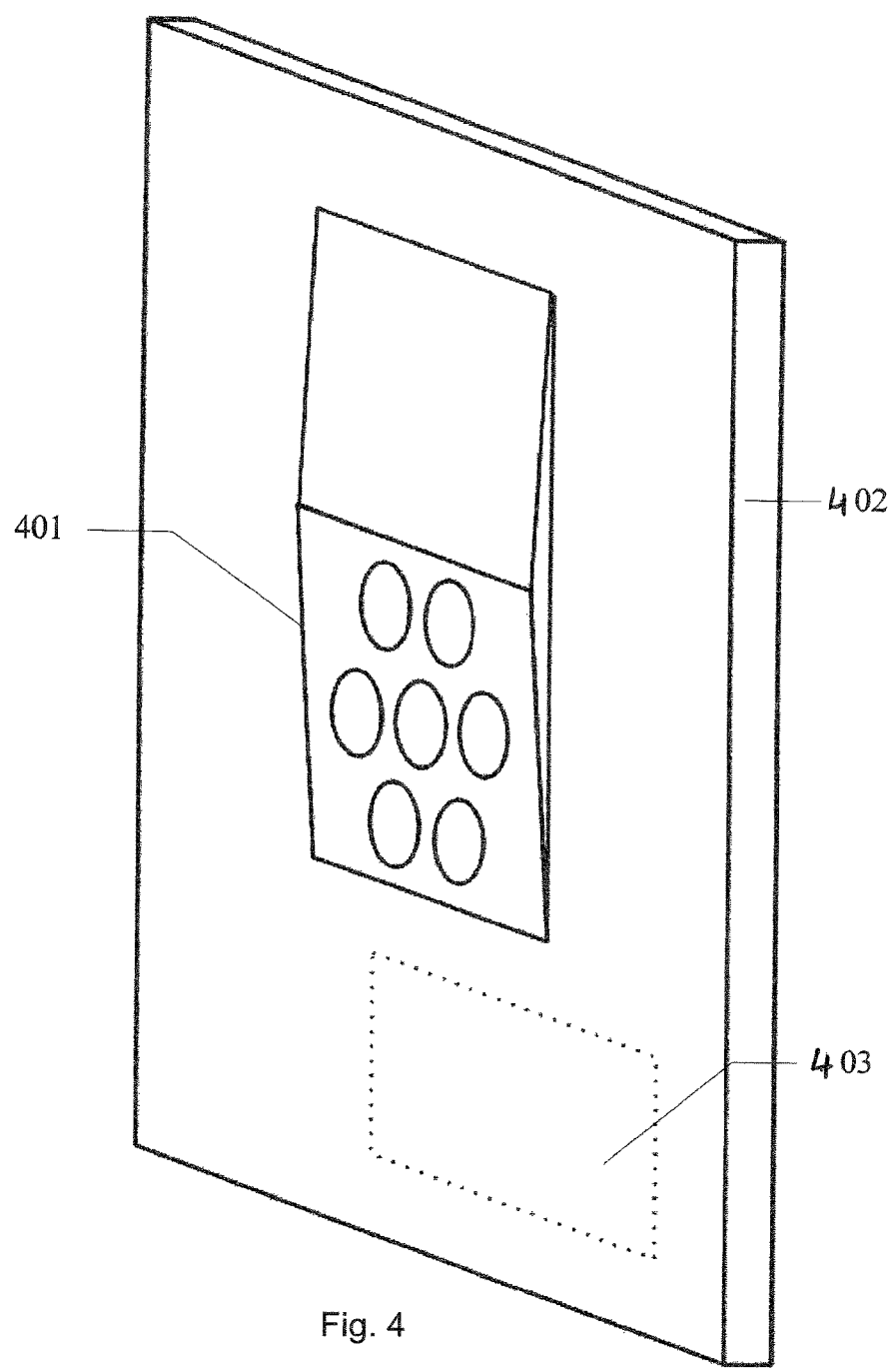
FIG. 4 shows an example of a folded camera module on a mobile device: (401) camera module in the folded position; (402) case of the mobile device; and (403) example of how the digital image-processing unit is placed.

A simple mechanism consisting of four vertical supports pivotally attached at the level of the photosensitive element is used to retract the camera module. The lenses are pivotally affixed to the supports on planes that extend perpendicularly to the optical axis. When folded, the supports swing into a horizontal position (as shown in FIG. 4). That is, the lenses compact onto the same plane as the photosensitive element, and the sum thickness of the entire construction reduces to a size no thicker than the thickest lens.

The advantages of the proposed solution for producing high-quality images on mobile devices are as follows:

I. While the height (thickness) of the proposed camera module is comparable to commercial modules in mobile devices, it radically increases (up to two orders of magnitude) the amount of light that reaches the camera's photosensitive element. This enables the camera to:
 1. Decrease exposure time, which, in turn, solves problems with image blur.
 2. Decrease the amount of noise in the resulting image (improve image quality and prevent low-contrast details from getting lost in the noise).
 3. Decrease weight (an optical system consisting of a small number of thin lenses significantly decreases total camera weight).
 4. Use large photosensitive elements (sensors) without affecting the overall thickness of the system.
 5. Decrease the loss of light and contrast in the image due to reflections from the lens surfaces thanks to the simplicity of the optical system.
 6. Record videos (which is practically impossible or makes systems much more expensive when multi-frame exposure is used).

II. When several photosensitive elements are used:
 no time is wasted on focusing (focusing distance is adjusted by changing the method used to select image parts from sensors that form the final image and by then combining them through digital methods; this also allows one to choose focusing distance and field depth after shooting); and
 a depth map can be created.

The invention claimed is:

1. A mobile device with optical elements located in a camera module, comprising:
 two or more photosensitive elements, wherein the photosensitive elements are sensors comprising of photosensitive pixels; and
 means to digitally process images obtained from the photosensitive elements, wherein the optical elements comprise a set of at least two thin lenses, mirrors, or both, and the camera module is installed on a mobile device case such that the camera module position relative to the case can be adjusted into two positions, wherein one of the two positions is an exposure position wherein the optical elements are oriented to allow light to be projected onto the photosensitive elements so that an image can be obtained on one or more photosensitive elements, and the second of the two positions which is adjacent to the case by being folded and in which the total thickness of the camera module is less than a cumulative thickness of all of the optical elements or all of the photosensitive elements.

2. The mobile device in claim 1, wherein the optical device comprises the sensors and lens groups that are separated by opaque partitions to form separate light fluxes from separate lens groups directed towards the photosensitive element and in which the digital image-processing facilities combine images obtained from the photosensitive elements to produce a single high-quality image.

3. The mobile device in claim 1, wherein the camera module comprises a Cooke triplet with thin lenses, an f/3.1 aperture, a 40 degree field of vision, 13.2×8.8 mm sensor, and 2.5 μm pixels.

* * * * *